Figure 1:
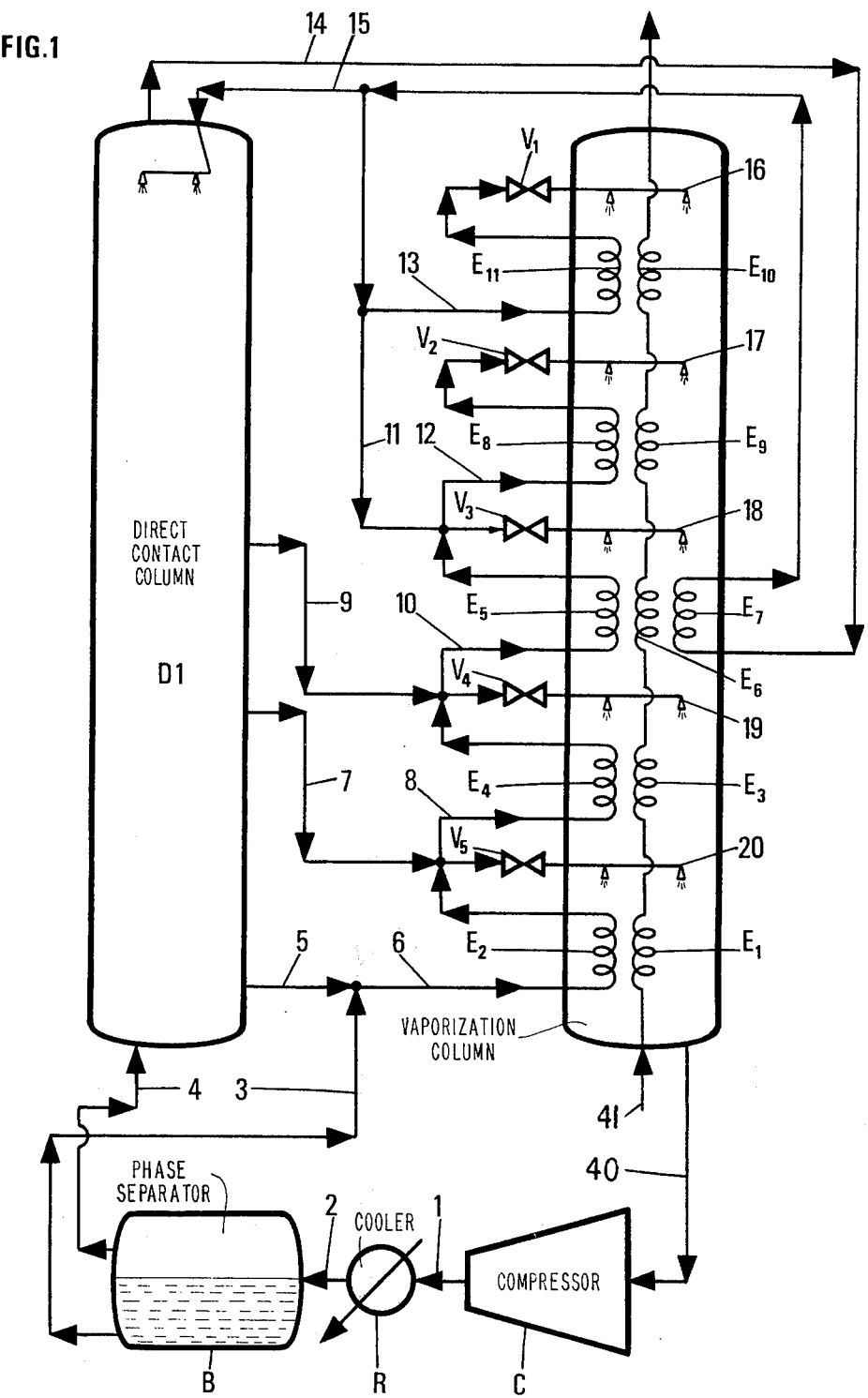

United States Patent [19]

Rojey

[11] 3,919,853
[45] Nov. 18, 1975

[54] PROCESS AND APPARATUS FOR COOLING AND/OR LIQUEFYING A GAS OR A GAS MIXTURE

[75] Inventor: Alexandre Rojey, Vanves, France

[73] Assignee: Institut Francais du Petrole, des Carburants et Lubrifiants, Paris, France

[22] Filed: Feb. 5, 1974

[21] Appl. No.: 439,934

[30] Foreign Application Priority Data
Feb. 12, 1973 France .............................. 73.04945

[52] U.S. Cl. .............................. 62/9; 62/23; 62/40
[51] Int. Cl.² .............................................. F29J 1/00
[58] Field of Search ........... 62/9, 11, 24, 27, 28, 29, 62/42, 43, 31, 32, 33, 40

[56] References Cited
UNITED STATES PATENTS
3,364,685  1/1968  Perret ........................................ 62/9
3,645,106  2/1972  Gaumer et al. ........................... 62/9

Primary Examiner—Norman Yudkoff
Assistant Examiner—Frank Sever
Attorney, Agent, or Firm—Millen, Raptes & White

[57] ABSTRACT

Process for cooling a fluid such as natural gas, particularly for liquefying it, comprising compressing a mixture of gaseous constituents of different boiling points, condensing a fraction thereof by cooling, which fraction is subsequently vaporized in indirect contact with the fluid to be cooled, progressively cooling the remaining gaseous fraction in a column by direct contact with a countercurrent of liquid reflux, vaporizing a liquid fraction withdrawn from said column in indirect contact with the fluid to be cooled, cooling the gaseous phase issued from the top of the column by indirect contact with a vaporized liquid fraction withdrawn from the column so as to liquefy at least a portion thereof, using a portion of the resulting liquid as liquid reflux in direct contact with the gaseous fraction and reconstituting the mixture of gaseous constituents by admixing the gases evolved during the step of vaporization in indirect contact with the fluid to be cooled.

26 Claims, 2 Drawing Figures

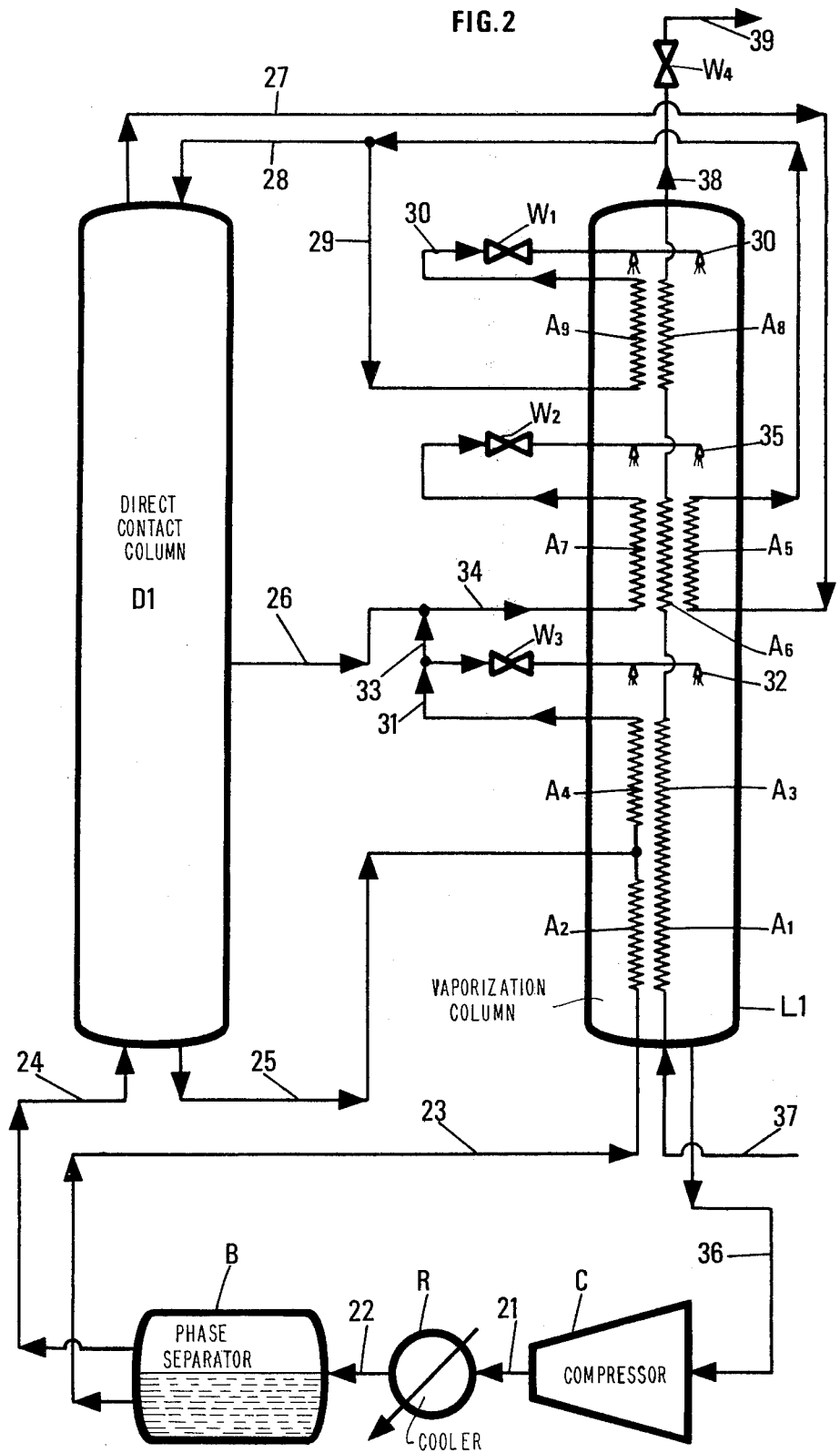

PROCESS AND APPARATUS FOR COOLING AND/OR LIQUEFYING A GAS OR A GAS MIXTURE

This invention concerns a new method for cooling at low temperature a gaseous or liquid material or mixture of materials. According to a preferred embodiment, the invention concerns the cooling and the liquefaction of a gaseous mixture such as natural gas, but it may also be used in any circumstance where it is desired to progressively cool down a stream of gas or liquid in order to obtain a change of phase or a cooling fluid at low temperature.

The best known method for liquefying natural gas consists of making use of several cooling cycles involving a liquefaction under pressure followed by a vaporization of the cooling fluid formed essentially of a pure substance. For achieving a temperature decrease, there are used pure substances whose critical temperatures are lower and lower, the vaporization of the liquid in each of the circuits providing for the cooling of the cooling fluid of at least one of the subsequent circuits, which can be thus brought below its critical temperature. This method makes it necessary to use a great number of compressors and heat exchangers.

Another method initially proposed by Podbielniak W. (U.S. Pat. No. 2,041,725) consists of making use of a mixture of constituents by condensing lighter and lighter liquid fractions, this condensation being obtained by cooling the pressurized gas in heat exchangers by vaporization of liquid fractions under a lower pressure, the vapor fractions obtained by vaporization of the liquid fractions being collected and compressed again.

This method requires the use of a number of exchangers and compressors which is less than according to the conventional cascade method and offers the advantage of a greater adaptability due to the possibility of modifying the composition of the cooling fluid.

However, this method also suffers from drawbacks due to the fact that the vaporization of each liquid condensate obtained from the cooling fluid must perform not only the cooling and condensation of the natural gas, but also the condensation of a new liquid fraction by means of the cooling fluid. Consequently, the surface of the exchangers and even the flow rate of the cooling fluid are much higher than those which would be required for cooling only the natural gas.

It has now been discovered that it is possible to avoid these drawbacks when operating according to the present invention.

The cooling process according to the invention consists of compressing, in a compression zone, a gaseous mixture of constituents having different boiling points, cooling the resulting compressed mixture by means of an external cooling fluid so as to liquefy a portion of said compressed mixture, separating the liquefied fraction from the remaining gaseous fraction, vaporizing the liquefied fraction by expansion thereof in indirect contact with the fluid to be cooled, in a heat exchange zone (A), transferring the remaining gaseous fraction under pressure to the bottom of a direct contact column, displacing said gaseous fraction upwardly through said column in countercurrent with a liquid reflux, for progressively cooling said gaseous fraction and enriching it with elements of low boiling point, withdrawing at least one liquid fraction from said column, vaporizing said last fraction by expansion in a heat exchange zone (B), in indirect contact with the fluid to be cooled, issued from the exchange zone (A), passing the vapor issued from the top of the column through an indirect heat exchange system, cooling said vapor in said system by contacting the same with at least one liquid fraction withdrawn from the column and subjected to vaporization, so as to cool said top vapor and liquefy at least a portion thereof, reintroducing at least a portion of said liquefied top vapor into the column, at the upper portion thereof and allowing the same to flow downwardly through said column as liquid reflux, in direct contact with the gaseous fraction moving upwardly through the column, and feeding the compression zone with vaporized fractions issued from the heat exchange zones in order to reconstitute the gaseous mixture of constituents having different boiling points.

As above stated, the invention therefore consists of separating a gaseous mixture of constituents having different boiling points, called cooling fluid, into liquid fractions of different boiling points and at least one uncondensed gaseous fraction, by fractionated liquefaction with direct contact under pressure, vaporizing each of said liquid fractions under reduced pressure in a heat exchange system through which circulates the fluid to be cooled, thereby cooling the latter, withdrawing the uncondensed gaseous fraction from the cooling fluid, passing the latter through a heat exchange system so as to condense at least a portion thereof, feeding back the condensate of said gaseous fraction to the fractional liquefaction zone as reflux, and recovering the gaseous fractions resulting from the vaporization of the liquid fractions, compressing them again and passing them through a condenser which reduces the temperature of the mixture to a value close to room temperature (0° to 50°C), i.e., a temperature close to that of an external source such as water or air, used as heat exchange fluid in said condenser. There is so obtained a gaseous fraction which feeds the liquefaction zone and a liquid fraction which is added to the vaporized liquid fractions in the fluid cooling zone.

Preferably the uncondensed gaseous fraction from the liquefaction column is cooled, in order to be liquefied, by passing the same through the above-defined exchange system.

The exchangers are of the indirect contact type without however excluding the mixture of various fluids at some preselected points. For example, the cooling fluid may consist, at least partly, of the fluid to be cooled.

The progressive cooling of the coolant in a liquefaction column, in order to achieve the progressive liquefaction thereof, is obtained by direct contact with the liquid reflux introduced at the top of the column.

At each point of introduction of a liquid fraction in the exchange system, the composition of the vaporized mixture may be adjusted so as to obtain a given bubble temperature, by admixture either with a fraction issued from the condenser operated by thermal exchange with an external source such as water or air, or with a fraction issued from the top reflux.

It is observed that, by admixing the liquid fractions withdrawn from the column with liquid fractions issued from the condenser operated by thermal exchange with an external source, there is achieved an additional vaporization enthalpy at the desired temperatures since it is possible to adjust the bubble temperature of the mixture by means of fractions of increasing volatility, withdrawn from the column or from the liquid fraction obtained by condensation of the top vapor.

The following example illustrates the invention. The apparatus is diagrammatically shown in FIG. 1. The cooling mixture contains 28% of methane, 36% of ethane, 14% of propane, 14% of butane, 7% of pentane and hexane and 1% of nitrogen. This cooling mixture is fed through duct 40, at a pressure of about 1 atmosphere, to the compressor C. At the outlet of the compressor C, the pressure of this cooling mixture is 35 atmospheres.

It is then conveyed, through duct 1, to the condenser R from where it is discharged at a temperature of 35°C. At this temperature a liquid phase and a gaseous phase are formed and these two phases (line 2) are recovered in the phase separator B. The gaseous phase is conveyed, through duct 4, to a column D 1 operated at a pressure of 35 atmospheres and comprising 15 plates. The liquid phase issues through duct 3 and is admixed with a first liquid condensate which is supplied through line 5, from column D 1, at a temperature of 32°C. The liquid mixture is cooled down to a temperature of −8°C in exchanger E 2, then admixed with the second liquid condensate supplied from column D 1 through line 7 at a temperature of −10°C, expanded from 35 atmospheres to a pressure of 1.2 atmosphere through the valve V 5 and vaporized through line 20. This vaporization results in a countercurrent cooling of the liquid supplied from line 6 through exchanger E 2 and of the natural gas which is fed through line 41 under a pressure of 40 atmospheres, at a temperature of 35°C and is discharged from exchanger E 1 at a temperature of −8°C. Another fraction of liquid condensate obtained by admixing the condensate issued from exchanger E 2 with the condensate issued from line 7, is fed, through line 8, to the exchanger E 4. The liquid mixture is cooled down to a temperature of −40°C, then admixed with the third condensate coming from column D 1 through line 9 at a temperature of −38°C, expanded from 35 atmospheres to a pressure of 1.2 atmospheres through the valve V 4 and vaporized through line 19. This vaporization provides for the countercurrent cooling of the liquid conveyed through line 8 to exchanger E 4 and of the natural gas issued from exchanger E 3 at a temperature of −40°C. Another fraction of liquid condensate, obtained by admixing the condensate issued from the exchanger E 4 with the condensate issued from line 9, feeds exchanger E 5 through line 10. The liquid mixture is cooled down to a temperature of −130°C, then admixed with a fraction of the top condensate supplied from line 11 at a temperature of −130°C, expanded from a pressure of 35 atmospheres to a pressure of 1.2 atmosphere through the valve V 3 and vaporized through line 18. This vaporization provides for the countercurrent cooling of the liquid supplied from line 10 through exchanger E 5, of the natural gas issued from exchanger E 6 in the liquid state at a temperature of −130°C and of the top vapor issued from the exchanger E 7 in the liquid state at a temperature of −130°C. Another fraction of liquid condensate obtained by admixing the condensate issued from the exchanger E 5 with the condensate issued from line 11, is conveyed through line 12 to exchanger E 8. The liquid mixture is cooled down to a temperature of −145°C, expanded through the valve V 2 and vaporized through line 17. This vaporization provides for the countercurrent cooling of the liquid passing from line 12 through exchanger E 8 and of the natural gas issued from exchanger E 9 in the liquid state at a temperature of −145°C. Another fraction of the top condensate supplied through line 13 to the exchanger E 11, issues from said exchanger at a temperature of −160°C, is expanded through the valve V 1 and vaporized through line 16. This vaporization provides for the countercurrent cooling of the natural gas issued from exchanger E 10, subcooled in the liquid state at −160°C. It is thus possible to maintain it in the liquid state when the pressure is brought back to a value close to 1 atmosphere.

The uncondensed gas present in the column D temperature: −80°C) is supplied through line 14, to the exchanger E 7, from where it is conveyed in the liquid state through line 15, and injected at the top of the column D 1 at a temperature of −115°C.

It is also possible to fractionate the natural gas in the course of the cooling step, so as to obtain a cut of high methane content, a cut having a high content of hydrocarbons heavier than methane and a cut with a high content of light elements such as nitrogen and helium. In this case, it is advantageous to expand at least partly the natural gas for separating the light elements.

Another embodiment of the invention is given hereinafter:

The installation is diagrammatically shown in FIG. 2. The natural gas to be liquefied has the following composition expressed in molar proportions:

nitrogen : 0.06
methane : 0.831
ethane : 0.073
propane : 0.022
butane : 0.010
pentane and heavier hydrocarbons: 0.004

This natural gas is conveyed through line 37 at a pressure of 37 atmospheres and at a temperature of 35°C. I make use of a cooling mixture whose composition, expressed in molar proportions, is as follows:

nitrogen : 0.024
methane : 0.236
ethane : 0.453
propane : 0.047
isobutane : 0.059
normal butane : 0.108
isopentane : 0.034
normal pentane : 0.039

The cooling mixture is fed through line 36 to the compressor C at a pressure of 2 atmospheres. At the outlet of compressor C (line 21) this cooling mixture is at a pressure of 35 atmospheres. After cooling by means of water at ordinary temperature in the cooling unit R, there are formed a liquid phase and a gaseous phase which are both sent, through line 22, to a flask B. The gaseous phase is sent through line 24 to the column D 1 which is operated at the feeding pressure of 35 atmospheres and which contains 30 plates. The liquid phase is sent, through line 23, to column L 1. In said column, the liquid phase is precooled in the exchanger A 2 and is admixed at a temperature of +20°C with the liquid phase issued from the bottom of column D 1, fed through line 25 at the same temperature. The liquid mixture is precooled in exchanger A 4 and a fraction of this mixture is expanded from the pressure of 35 atmospheres to a pressure of 2.5 atmospheres, through the valve W 3, introduced into the cooling column through the injection ramp 32 and admixed with the liquid-vapor mixture issued from the upper portion of the cooling column. I thus obtain a cooling temperature of −55°C and the vaporization of the liquid fraction expanded through the valve W 3 ensures, by countercurrent flow, the precooling of the liquid mixture circulating through exchangers A 2 and A 4 and the cooling of the natural gas circulating through exchangers A 1 and A 3. The portion of the liquid mixture conveyed through duct 31 and not expanded through valve W 3 (line 33) is admixed with a liquid fraction withdrawn (through line 26) from a plate of column D 1 operated at a temperature of −50°C. The mixture of said liquid fraction is conveyed through duct 34, precooled in exchanger A 7, expanded through valve W 2, introduced into the cooling column through the injection ramp 35 and combined with the liquid-vapor mixture issued from the upper portion of the cooling column. There is so obtained a temperature of −115°C and the vaporization of the mixture provides, by means of a countercurrent circulation, the precooling of the liquid mixture circulating through exchanger A 7, the cooling of the natural gas circulating through exchanger A 6 and the cooling of the top vapor (temperature: −80°C) of column D 1, fed through duct 27 to exchanger A 5. This cooling provides for the liquefaction of said top vapor and, after withdrawal of a distillate, makes it possible to send back a liquid reflux (line 28) into column D 1, at a temperature of about −115°C. The distillate is conveyed through duct 29 to the cooling column, subcooled in exchanger A 9, expanded from a pressure of 34 atomspheres to a pressure of 3 atmospheres through valve W 1 and introduced into the cooling column through injection ramp 30. The pressure of 3 atmospheres corresponds to the suction pressure of compressor C increased by the pressure drop of the cooling fluid through the cooling column. There is so obtained a temperature of −172°C and the vaporization of the mixture provides, by means of a countercurrent flow, the subcooling of the distillate and the subcooling of the natural gas in exchanger A 8. The natural gas issues from the cooling column through duct 38 at a temperature of −166°C at which it may be maintained in the liquid state under atmospheric pressure. The natural gas is expanded through the valve W 4 and sent to a storage tank through duct 39.

As a general rule, the gas pressure at the outlet of the compressor and the pressure prevailing in the liquefaction column are from 10 to 70 atmospheres. The pressure, after expansion and vaporization, is usually from 0.1 to 10 atmospheres. The compressor may consist of several stages and may include intermediary condensors. The diagram of the figure is given by way of example and the number as well as the position of the exchangers and of the liquid withdrawal points may be varied. The expansion of the liquid condensates may be carried out at different pressures when using several compression stages and, in this case, a gaseous stream obtained by vaporization may be fed back directly to the column without being admixed with the others.

Moreover, it is also possible to introduce intermediary reflux into the column by withdrawing a gaseous fraction at an intermediary level, condensing at least a portion thereof by the cooling effect resulting from the vaporization of at least one liquid fraction obtained by liquefaction, and feeding back the liquid condensate to the column.

Such an arrangement results particularly in the reduction of the flow rate of vapor to be condensed at the top.

Although I referred to a column with plates, it is obvious that the column may be of a different type provided that it makes it possible a fractionation and the withdrawal of liquid at different levels.

It must be understood that the cooling fluid must contain at least one constituent which can be liquefied by mere compression at the ordinary temperature.

The natural gas is generally liquefied under a pressure of from 10 to 70 atmospheres.

As a general rule, the uncondensed gas withdrawn from the top of the liquefaction column (line 14 of FIG. 1) is at a temperature of from about −60°C to about −125°C; the liquid reflux (line 15) is at a lower temperature, usually from −80°C to −130°C.

According to the principle of the invention, it is possible to obtain a progressive cooling in numerous other applications than the production of liquefied natural gas, for example in the liquefaction of industrial gases such as hydrogen, nitrogen or helium, in view of their transportation or storage, the fractionation of a gaseous mixture by progressive cooling giving rise to the formation of a condensed phase which particularly permits, as already mentioned, to separate a heavy fraction and a light fraction from natural gas, but also the various light constituents contained in the effluents from naptha steam-cracking unit such as methane, ethylene, ethane, propane or in the effluents from units of ethane, propane or gas-oil steam-cracking or still the separation of hydrogen from methane by liquefaction of methane.

I claim:

1. In a multistage process for cooling a normally gaseous fluid, comprising compression, in a compression zone, a gaseous mixture of constituents having different boiling points, cooling the so-compressed mixture so as to liquefy a fraction of said compressed mixture; separating the liquefied fraction from the remaining gaseous fraction; vaporizing the liquefied fraction by expansion thereof in indirect contact with the fluid to be cooled, in a first heat exchange zone; forming a second liquid fraction from the remaining gaseous fraction; revaporizing said second liquid fraction by expansion thereof in a second heat exchange zone in indirect contact with said fluid to be cooled; and feeding the compression zone with the vaporized fractions issued from the indirect contact heat exchange zones in order to reconstitute the gaseous mixture of constituents of different boiling points, wherein the improvement comprises feeding said remaining gaseous fraction under pressure, to the bottom of a substantially vertical direct contact zone, moving said gaseous fraction upwardly through the direct contact zone, in direct countercurrent contact with a liquid reflux for progressively cooling said gaseous fraction and increasing in said gaseous fraction the content of elements having a low boiling point; withdrawing at least one liquid fraction from the direct contact zone, vaporizing the last-mentioned fraction by expansion thereof in said second heat exchange zone in indirect contact with the fluid to be cooled, passing a vapor fraction issued from the direct contact zone through an indirect heat exchange system to cool said vapor fraction in said system by indirect heat exchange contact with at least one liquid fraction withdrawn from the direct contact zone, so as to liquefy at least one portion of said vapor fraction and vaporize said liquid fraction; reintroducing at least one portion of said liquefied vapor fraction into the direct contact zone, at the upper part thereof, and allowing said liquefied vapor fraction to flow downwardly through the direct contact zone as liquid reflux in direct contact with said remaining gaseous fraction which flows upwardly through the direct contact zone.

2. In a process for cooling a normally gaseous fluid stream by indirect contact with progressively colder liquid fractions of a depressurized cooling fluid under vaporization, said cooling fluid consisting of a mixture of constituents of different boiling points, wherein the resulting vaporized fractions of the cooling fluids are thereafter at least partly re-mixed, compressed and progressively cooled, the improvement consisting essentially of partially liquefying said vapor fractions, separating resultant liquid from remaining remixed and compressed vapor fractions, conducting at least a part of said cooling of the remaining re-mixed and compressed vapor fraction by direct countercurrent contact, in a direct contact zone, with a first liquid phase $P_1$), separating a vapor phase resulting from this direct contact, cooling said vapor phase to convert said vapor phase at least partly to a third liquid phase ($P_3$), and recovering at least a portion of said third liquid phase ($P_3$) to reconstitute said first liquid phase ($P_1$).

3. A processs according to claim 1, comprising withdrawing several separate liquid fractions from the direct contact zone and vaporizing said fractions in the second exchange zone at different vertically spaced points of said second exchange zone, in a decreasing order to the boiling points of said liquid fractions with regard to the direction of flow of the fluid to be cooled.

4. A process according to claim 1, in which a portion of the liquid fraction withdrawn from one level of the direct contact zone is admixed with a fraction withdrawn at a level higher than said one level of the direct contact zone, in order to adjust the bubble point of the latter.

5. A process according to claim 1 in which at least a portion of the liquefied fraction, obtained by cooling the compressed gaseous mixture, is admixed with at least the first liquid fraction withdrawn from the direct contact zone for adjusting the bubble point thereof.

6. A process according to claim 1 in which a portion of the liquefied vapor fraction is expanded and vaporized in an indirect heat exchange system in contact with the fluid to be cooled, after the latter has been partially cooled by vaporization of at least one of the liquid fractions withdrawn from the direct contact zone.

7. A process according to claim 1 in which a portion of the liquefied vapor fraction is admixed with at least one of the liquid fractions withdrawn from the direct contact zone and vaporized in admixture with the latter.

8. A process according to claim 3, in which the fluid to be cooled flows through the indirect second heat exchange zone in countercurrent with respect to the vaporized liquid fractions.

9. A process according to claim 1 in which the gaseous mixture comprises hydrocarbons having from 1 to 8 carbon atoms per molecule.

10. A process according to claim 1 in which the gaseous mixture contains methane and ethane.

11. A process according to claim 9 in which the gaseous mixture also contains a member selected from the group consisting of nitrogen, helium and hydrogen.

12. A process according to claim 1 in which the gaseous mixture is introduced into the direct contact zone under a pressure of from 10 to 70 atmospheres.

13. A process according to claim 12 in which the liquid fractions withdrawn from the direct contact zone are expanded and vaporized under a pressure substantially lower than that prevailing in the direct contact zone and which ranges from 0.1 to 10 atmospheres.

14. A process according to claim 1, in which the fluid to be cooled is a member selected from the group consisting of natural gas and a fraction of natural gas and the cooling step is of sufficient capacity to liquefy at least the major part of said member.

15. A process according to claim 1, in which at least a portion of the cooling gaseous mixture is obtained from natural gas.

16. A process according to claim 14, in which the natural gas flows through the heat exchange zones under a pressure of from 10 to 70 atmospheres.

17. A process according to claim 14, in which the liquefied natural gas is then subcooled to a temperature lower than the bubble point temperature of said liquefied natural gas under atmospheric pressure and then expanded and stored.

18. A process according to claim 14, in which the natural gas is fractionated during its cooling into a cut of high methane content, a cut containing a major portion of hydrocarbons heavier than methane and a cut containing a major portion of components boiling lower than methane.

19. A process according to claim 1, in which the compressed gaseous mixture is cooled by a member selected from the group consisting of air and water at room temperature.

20. A process according to claim 2, wherein the direct contact is a direct counter-current contact.

21. A process according to claim 2, wherein the cooling of the vapor phase resulting from the direct contact with the phase ($P_1$) is carried out by indirect contact with a second liquid phase ($P_2$) under vaporization, withdrawn from the direct contact zone at an intermediary point thereof.

22. A process according to claim 2, wherein a portion of the third liquid phase ($P_3$) is depressurized and vaporized in indirect contact with the fluid stream in a final cooling step.

23. A process according to claim 2, wherein the cooling fluid comprises at least methane and ethane, the pressure is 10–70 atmospheres within the direct contact zone, the liquid phase $P_1$ is supplied to said zone at a temperature of from −80° to −130°C and the vapor phase is separated from said zone at a temperature of from −60° to −125°C.

24. A process according to claim 2, wherein the three major components of the cooling fluid are methane, ethane and butane.

25. A process according to claim 1, wherein the gaseous mixture of constituents having different boiling points comprises methane and ethane, the pressure is 10–70 atmospheres within the direct contact zone, resultant vapor from the direct contact zone is discharged at a temperature of from −60° to −125°C and said at least one portion of liquefied vapor is reintroduced into the direct contact zone at a temperature of from −80° to −130°C.

26. A process according to claim 25, wherein the three major components of the gaseous mixture are methane, ethane and butanes.

* * * * *